United States Patent [19]

Cook et al.

[11] Patent Number: 4,875,437
[45] Date of Patent: Oct. 24, 1989

[54] APPARATUS FOR CONTROLLING THE FLOW OF COOLING FLUID IN AN ENGINE

[75] Inventors: Andre Cook; Jean P. Chamot, both of Arpajon, France

[73] Assignee: Procedes Vernet, Arpajon Cedex, France

[21] Appl. No.: 128,438

[22] Filed: Dec. 3, 1987

[51] Int. Cl.$^4$ .............................................. F01P 7/16
[52] U.S. Cl. .................................. 123/411; 123/41.13
[58] Field of Search ............... 123/41.08, 41.09, 41.1, 123/41.13

[56] References Cited

U.S. PATENT DOCUMENTS

| 1,558,009 | 10/1925 | Giesler | 123/41.1 |
| 2,268,083 | 12/1941 | Rapuano | 123/41.08 X |
| 2,377,028 | 5/1945 | Nicholas | 123/41.09 |
| 3,313,483 | 4/1967 | Nallinger | 236/34.5 |
| 3,907,199 | 9/1975 | Kreger | 237/12.3 |
| 4,055,298 | 10/1977 | Wilson | 123/41.09 X |
| 4,319,547 | 3/1982 | Bierling | 123/41.08 X |
| 4,393,819 | 7/1983 | Tanaka et al. | 123/41.08 |
| 4,399,775 | 8/1983 | Tanaka et al. | 123/41.08 |
| 4,399,776 | 8/1983 | Shikata | 123/41.08 |
| 4,522,334 | 6/1985 | Saur | 236/34.5 |
| 4,537,158 | 8/1985 | Saur | 123/41.1 |

FOREIGN PATENT DOCUMENTS

| 923177 | 6/1947 | France | 123/41.08 |
| 1472712 | 3/1967 | France . | |
| 2434723 | 3/1980 | France . | |
| 695730 | 8/1953 | United Kingdom | 123/41.08 |
| 947736 | 1/1964 | United Kingdom | 123/41.1 |

Primary Examiner—Craig R. Feinberg
Attorney, Agent, or Firm—Lane & Aitken

[57] ABSTRACT

A mixing valve for an engine cooling system includes a cylindrical chamber, a main thermostatic element mounted in the chamber, first and second inlets axially spaced along the chamber, and a sleeve connected to the thermostatic element and movable in response to the changing temperature of liquid flowing through the chamber from a position completely blocking flow through one inlet and leaving the other inlet totally open to positions gradually permitting flow through the first inlet and restricting flow through the second inlet. A second thermostatic element is positioned outside the body of the mixing valve and has a piston axially aligned with a piston of the main thermostatic element and engaged therewith to adjust the starting position and range of movement of the sleeve. The second thermostatic element is responsive to parameters such as external air temperature, engine load, engine speed, etc. The double thermostatic element arrangement is also disclosed in connection with poppet valves.

24 Claims, 6 Drawing Sheets

APPARATUS FOR CONTROLLING THE FLOW OF COOLING FLUID IN AN ENGINE

BACKGROUND OF THE INVENTION

The present invention concerns apparatus for controlling the flow of cooling fluid in a cooling system for an internal combustion engine, and more particularly, a thermostatic mixing valve in an engine cooling system having a radiator, a circulating pump, and fluid connections for circulating cooling liquid from the engine through the radiator and back to the engine, and from an outlet of the engine directly back to an inlet of the engine, bypassing the radiator. The thermostatic mixing valve includes inlets for receiving the cooling liquid from the radiator and from the engine, and a thermostatic element which is sensitive to the temperature of a mixture of the incoming liquids and, thereby, determines the proportions of the two liquids which flow through the mixing valve.

The liquid flowing from the radiator is relatively cold and the liquid flowing from the outlet of the engine is relatively hot, so that "cold liquid" and "hot liquid" can be used to identify the liquids coming from the two sources. However, there are situations where the liquid coming from the radiator, the liquid coming from the engine outlet, and the liquid coming from the outlet of the thermostatic mixing valve are all at the same temperature, for example, when the engine is cold. There are also periods when the socalled hot liquid is at a relatively low temperature, such as during the engine starting period.

A mixing valve of the type mentioned above is described, for example, in French Patent No. FR A - 1 472 712. In that valve, the thermostatic element is sensitive not only to the mixed liquid temperature but also to the cold liquid temperature, and it controls two separate poppets which calibrate, respectively, the hot liquid flow and the cold liquid flow to be mixed (see FIG. 3 of the French patent). It can also control a sliding sleeve opening a direct communication between hot liquid and mixed liquid (FIG. 2 of the French patent).

French Patent No. FR A - 2 434 723 discloses a mixing valve having a slide which increases the inlet area of the relatively hot liquid while decreasing the inlet area of the relatively cold liquid and vice versa, but the valve is installed, not in the engine cooling system, but in an auxiliary liquid circuit passing through an air-liquid heat exchanger for the hot air heating of the passenger compartment.

SUMMARY OF THE INVENTION

A principal objective of the present invention is to simplify the construction of mixing valves for use in engine cooling systems. A further object of the invention is to make the mixing valves responsive to external parameters in addition to the temperature of the mixed fluid.

In order to attain the first of these objectives, the mixing valve according to the present invention includes a body having a cylindrical chamber, an outlet at an axial end of the cylindrical chamber, at least one inlet port into the cylindrical chamber at a position remote from the outlet for receiving relatively cold fluid from the radiator, at least one inlet port into the cylindrical chamber at a level between the first inlet port and the outlet for receiving relatively hot liquid from an outlet of the engine, a thermostatic element having a part moveable in response to the temperature of the mixed fluid in the cylindrical chamber, and a sleeve positioned in the chamber in sliding, sealing engagement with the valve body, the sleeve being moveable progressively with the moveable part of the thermostatic element between a position obstructing flow through the inlet connected to the radiator and the inlet connected to the engine outlet. As the sleeve gradually permits an increase in flow through the inlet from the radiator, it gradually reduces the flow through the inlet from the engine in order to adjust the temperature of the mixed liquid. The construction of the mixing valve is simplified compared to the prior art in that a single sleeve replaces two poppet valves and the eventual supplementary sleeve in the construction according to French Patent No. 1 472 712.

The axial end of the cylindrical chamber opposite to the outlet is closed by a transverse wall acting as a fixed point for the thermostatic element. A second thermostatic element is positioned outside of the body of the mixing valve and engages the first thermostatic element so as to move the first thermostatic element and, thereby, adjust the starting position and range of movement of the sleeve. The second thermostatic element is responsive directly to external air temperature or is actuated by an electrical resistance heater which is responsive to various other parameters, such as engine load, engine speed, etc.

DETAILED DESCRIPTION OF THE PREFERRED EMBODIMENTS

Figure 1:
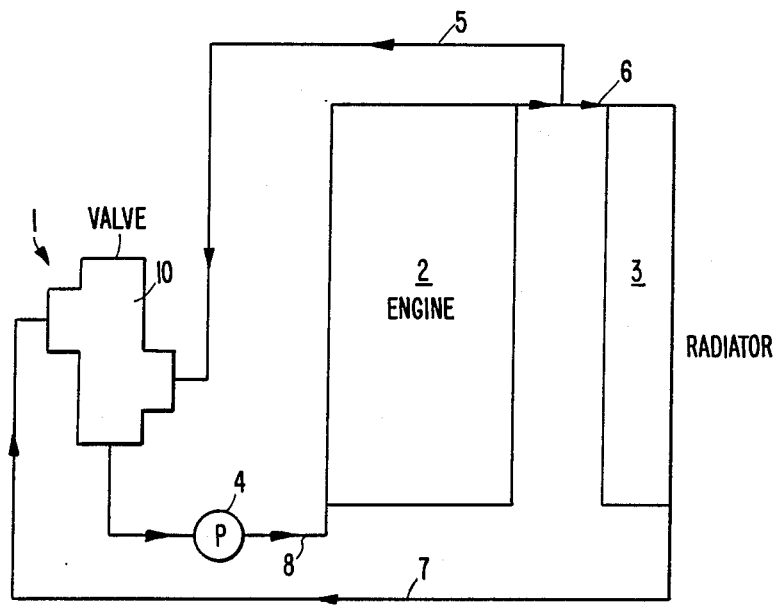
FIG. 1 is a schematic illustration of a cooling system for an internal combustion engine, including a mixing valve.

FIG. 1 schematically illustrates the use of a thermostatic mixing valve 1 in a cooling liquid circuit for an internal combustion engine 2, the circuit being equipped with a cooling radiator 3 and a circulating pump 4. The mixing valve 1 is mounted on a bypass 5 between a conduit 6 for directing relatively hot cooling liquid from the engine 2 going to the radiator 3 and the conduits 7 and 8 directing relatively cold cooling liquid from the radiator 3 back to the engine 2. The circulating pump 4 is mounted on a portion of the conduit 8 which is located downstream from the mixing valve 1. The mixing valve composes, by mixing the hot liquid (coming from the bypass 5) and the cold liquid (coming from the conduit 7) in variable proportions, a mixed liquid which is introduced into the engine 2 through the conduit 8.

Figure 2:
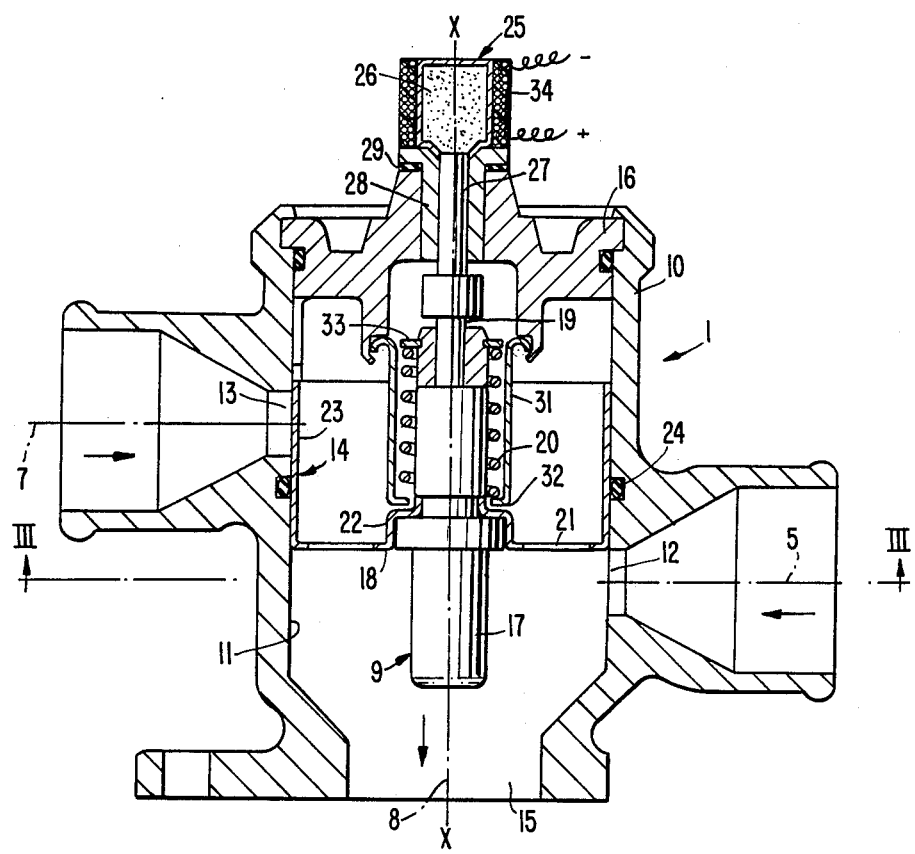
FIG. 2 is a cross-section of the mixing valve according to the present invention suitable for use in the cooling system of FIG. 1.
Figure 3:
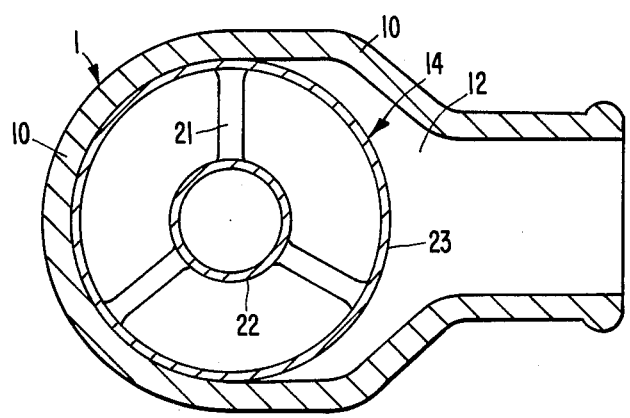
FIG. 3 is a cross-section along the line III—III of FIG. 2.

As can be seen from FIG. 2, the mixing valve 1 includes a thermostatic element 9 which is sensitive to the temperature of the mixed liquid and determines the respective proportions of hot liquid and cold liquid in the mixed liquid. The mixing valve 1 includes a body 10 having an internal cylindrical chamber 11 into which the hot liquid and the cold liquid flow through inlet ports 12 and 13, respectively, which are offset from one another with respect to the axis of the cylindrical chamber 11. The valve body 10 can have one port 12 for the inlet of hot liquid, or can have several ports 12 arranged on the same plane transverse to the axis of the cylindrical chamber 11. Similarly, the body can include one or more inlet ports 13 for the cold liquid which are arranged on the same transverse plane as one another and are axially spaced from the inlet ports 12.

A cylindrical sleeve 14 is located in the cylindrical chamber 11 and is connected to a moveable part of the thermostatic element 9 so that it is moveable axially within the cylindrical chamber 11 so as to gradually close the hot liquid inlet port 12 and gradually open the cold liquid inlet port 13 as the temperature of the mixed liquid increases, and vice versa. An outlet port 15 for the mixed liquid extends through the axial end of mixing valve 1 which is remote from the cold liquid inlet port 13, which is at the bottom at the valve body 10 as it is shown in FIG. 2, and the cylindrical chamber is closed at its end opposite to the outlet port 15 by a transverse wall 16, which is used as a fixed point for the thermostatic element 9.

The thermostatic element 9 is composed of a wax element in a housing 17 fixed to an open transverse wall 18 integral with the sleeve 14. The housing 17 of the wax element is coaxial with the cylindrical chamber 11, spaced from the side of the cylindrical chamber and projected from the open transverse wall 18 toward the outlet port 15. The housing 17 of the thermostatic element 9 is supported on the transverse wall 16 by a retainer 31 depending from the transverse wall 16 and including an inwardly directed rim 32 supporting a spring 20 which engages a washer 33 secured at an end of the housing 17 adjacent to the transverse wall 16. By this arrangement, the spring 20 biases the housing 17 and the cylindrical sleeve 14 toward the transverse wall 16. The open transverse wall 18 comprises radial arms 21 connecting a central hub 22, which is crimped around the housing 17 for the wax element, to a cylindrical skirt 23 at the end of the skirt which is closest to the outlet port 15. The radial arms 21, the central hub 22 and the cylindrical skirt 23 are made from just one piece of material. A seal ring 24 mounted in an annular groove around the cylindrical chamber 11 between the inlet ports 12 and 13 cooperates with the cylindrical skirt 23 of the sleeve 14 to prevent leaks along the external surface of the skirt 23.

In operation, the mixing valve 1 operates as follows. When the engine 2 is cold, the "hot" liquid arriving at the inlet port 12 of the mixing valve 10 to the engine 2 via the conduit 5 is in fact at ambient temperature, that is to say, the temperature of this liquid is fairly low. Therefore, the thermostatic element 9 is contracted and the cylindrical sleeve 14 occupies a position close to the transverse wall 16, which is the upper position shown in FIG. 2, as a result of the biasing of the spring 20. The inlet port 13 is closed by the cylindrical skirt 23, preventing liquid in the cooling system from circulating through the radiator 3. The inlet port 12 is fully open and the cooling liquid in the cooling system, circulated by the pump 4, flows through the conduits 4 and 5 between the engine 2 and the mixing valve 1, bypassing the radiator 3.

When the engine 2 is started and has run for a while, the liquid flowing from the engine 2 through the inlet port 12 warms up progressively, expanding the thermostatic element 9. This expansion forces a piston 19 of the thermostatic element 9 to extend farther out of the housing 17, moving the cylindrical sleeve 14 away from the transverse wall 16 (down, as shown in FIG. 2), gradually closing the inlet port 12 and gradually opening the inlet port 13, which is in communication with the radiator 3. An increasingly greater proportion of cold liquid coming from the radiator 3 is allowed to flow through the inlet port 13, from which it passes inside the cylindrical skirt 23, past the radial arms 21, and mixes with the hot liquid arriving through the inlet port 12. The cold liquid and the hot liquid mix at a temperature level determined by the thermostatic element 9, which, in this way, produces automatic temperature regulation of the liquid sent through the outlet 15 and back to the engine 2 by the pump 4.

In the mixing valve 1 as described, the piston 19 of the thermostatic element 9 projects from the housing 17 toward and into engagement with the transverse wall 16, the piston 19 being in engagement with the transverse wall 16 for all positions of the thermostatic element 9 and, therefore, for all positions of the cylindrical sleeve 14. Expansion of the wax element due to an increase in temperature of the mixed liquid cannot move the piston 19 upward, since such movement is prevented by the transverse wall 16. Therefore, the expansion must be accommodated by movement of the housing 17 downward, away from the transverse wall 16, thereby moving the cylindrical sleeve 14.

Instead of engaging a stationary transverse wall 16, whereby the starting point of the range of movement of the thermostatic element 17 and the cylindrical sleeve 14 is always the same, the piston 19 can engage a second, or auxiliary, thermostatic element 25 mounted on the transverse wall 16. The auxiliary thermostatic element 25 includes a wax element 26 mounted outside of the valve body 10, where the wax element 26 is sensitive to ambient air temperature or to the temperature of air in the engine compartment. The thermostatic element 25 includes a piston 27 within a guide 28 mounted in a bore in the transverse wall 16 so that the piston 27 is free to move into and out of the cylindrical chamber 11 of the valve body 10. A sealing ring 29 is provided around the guide 28 on an external surface of the transverse wall 16. As the temperature of the ambient air or the air in the engine compartment increases, the wax element 26 in the auxiliary thermostatic element 24 expands, thereby forcing the piston 27 farther into the cylindrical chamber 11 and moving with it the thermostatic element 9 and the cylindrical sleeve 14. In so doing, the operation of the auxiliary thermostatic element 25 modifies the starting point of the cylindrical sleeve 14 and the operating range of the mixing valve 1.

Instead of being mounted on the transverse wall 16, the auxiliary thermostatic element 25 could also be positioned at a distance from the wall 16 and operatively connected to the piston 19 of the thermostatic element 9 by a transmission rod (not shown) which extends through the transverse wall 16 and acts as an extension of the piston 27. Whether the auxiliary thermostatic element 25 is responsive to the ambient temperature or to the temperature in the engine compartment, and whether the auxiliary thermostatic element 25 is mounted on the transverse wall 16 or spaced therefrom, the mixing valve 1 is adapted to operate in various ranges in response to temperature conditions which are defined in the technical specifications of certain automobile manufacturers, such as "arctic" conditions, "temperate" conditions and "tropical" conditions. In other variations according to the present invention, the auxiliary thermostatic element 25 can be made sensitive to at least one engine operating parameter other than the temperature of the mixed cooling fluid in the valve body 10.

Figure 4:
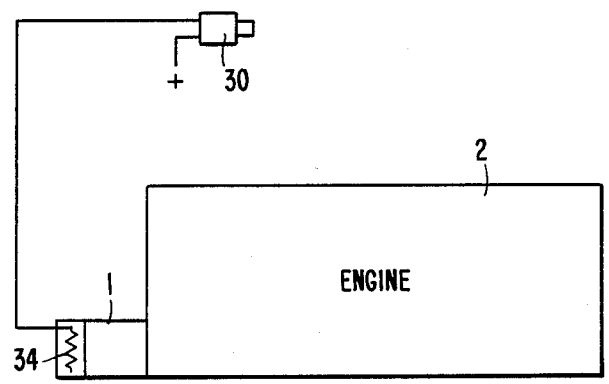
FIG. 4 is a schematic illustration of an engine cooling system employing a temperature sensor for actuating the auxiliary thermostatic element of the thermostat.

FIG. 4 schematically illustrates an arrangement of the thermostatic mixing valve 1 according to the present invention in connection with the internal combustion engine 2 and its cooling system, in which a thermoswitch 30 is connected in a circuit with an electric resistance heating element 34 which is in heat transfer relationship with the wax element 26 in the auxiliary thermostatic element 25. The thermoswitch 30 senses the temperature of the surrounding air and completes or breaks the circuit to the resistance heating element 34 in response to the air temperature rising above or falling below a predetermined set point or set points. The thermoswitch 30 can be mounted in a position in which it senses the temperature of the ambient air, that is, the air in front of the radiator.

Figure 5:
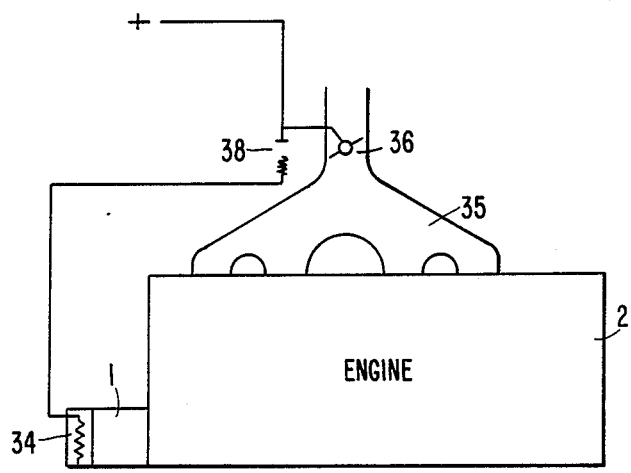
FIG. 5 is a schematic illustration of an engine cooling system employing an engine load sensor for actuating the auxiliary thermostatic element of the thermostat.

In another arrangement according to the present invention, as can be seen in FIG. 5, the engine 2 includes an intake manifold 35 and a throttle valve 36 which controls the volume of vaporized fuel charge delivered to the engine 2. A switch 38, which is connected in a circuit with the electric resistance heating element 34, detects the position of the throttle valve 36, the throttle valve position being a measure of the load on the engine. The switch 38 completes or interrupts the flow of current to the electric resistance heating element 34 in response to a predetermined position of the throttle valve 36, and thereby, in response to the load on the engine 2. The switch 38 can be conventional microswitch set to be actuated at a predetermined throttle position, for example, at about 7/10 of the total travel of the throttle.

Figure 6:
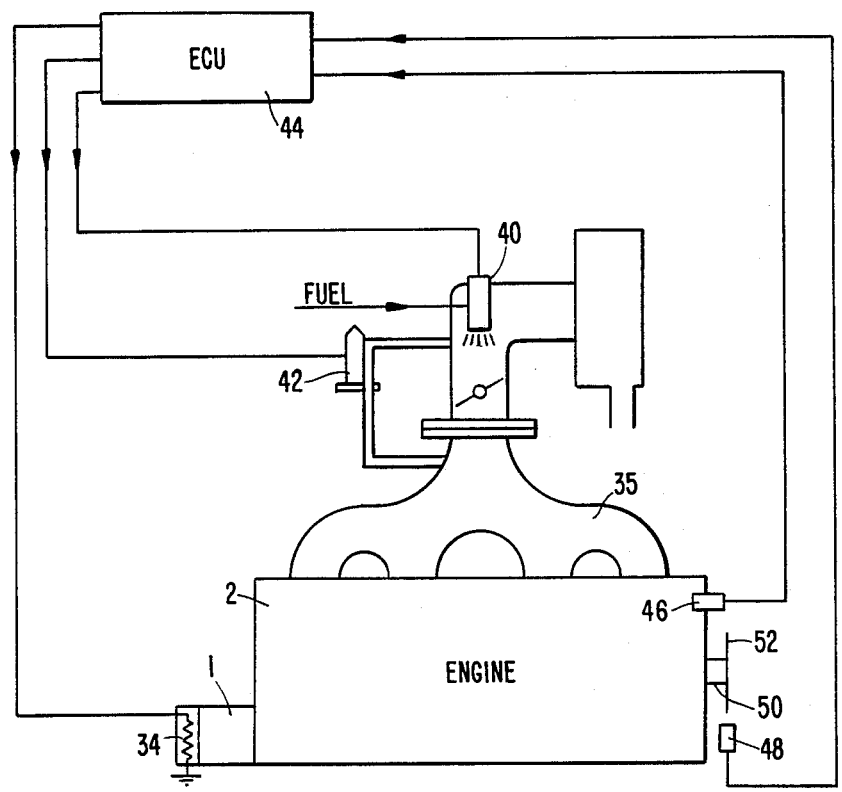
FIG. 6 is a schematic illustration of a cooling system for an engine having fuel injectors and a fuel injection computer which actuates the auxiliary thermostatic element of the thermostat.

Another arrangement according to the present invention which is illustrated in FIG. 6, includes a fuel injector 40 and an auxiliary air valve 42 controlling the flow of additional air into the intake manifold 35. An injection computer 44 includes outputs to the fuel injector 40 and the auxiliary air valve 42, as well as to the resistance heating element 34, so as to control each of these devices in response to changes in inputs to the injection computer 44. The inputs shown in FIG. 6 include an input from a temperature sensor 46 detecting the temperature of cooling liquid in the water jacket of the engine and a speed sensor 48 which detects the engine speed by measuring the speed of rotation of a crankshaft 50 or a flywheel 52. Other inputs to the injection computer 44 can be included, such as an input from an ambient temperature thermoswitch, the thermoswitch 30 disclosed in connected with FIG. 4, and/or a load switch 38, such as that disclosed in connection with FIG. 5. Still other parameters may be included as inputs to the injection computer, such as the conditions in pollution control equipment for both diesel and spark ignition engines.

Figure 7:
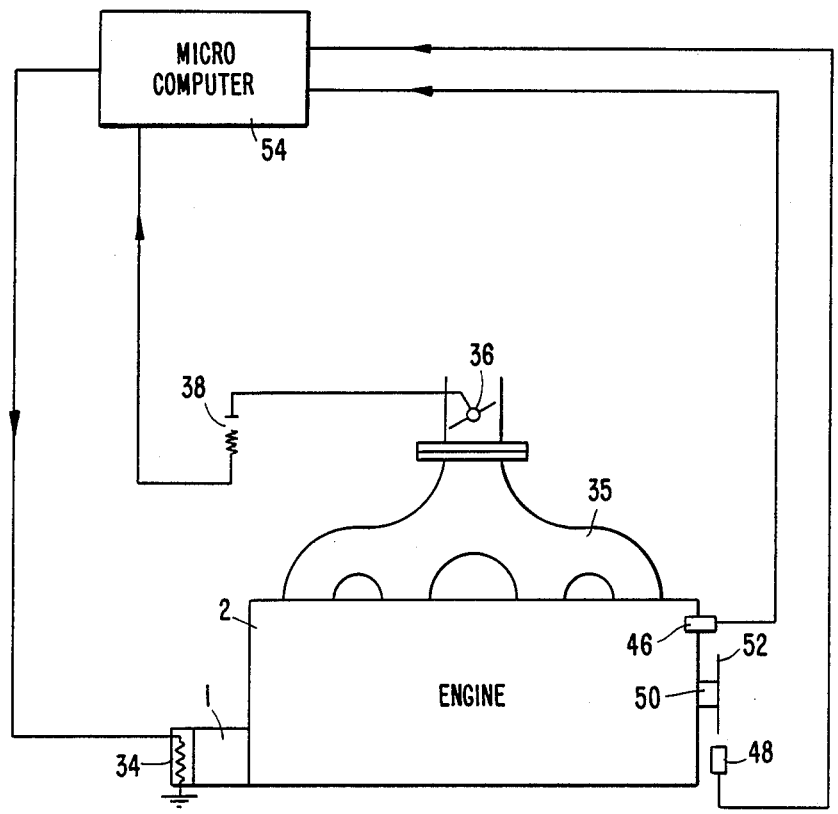
FIG. 7 is a schematic illustration of an engine cooling system employing a microprocessor for actuating the auxiliary thermostatic element of the thermostat.

In the embodiments shown in FIG. 7, a stand-alone microcomputer provides a current to the electrical resistance heating element 34 in response to a combination of conditions including the load on the engine as determined by the load switch 38, the cooling liquid in the engine cooling jacket as detected by the temperature sensor 46 and the engine speed as detected by the sensor 48.

Figure 8:
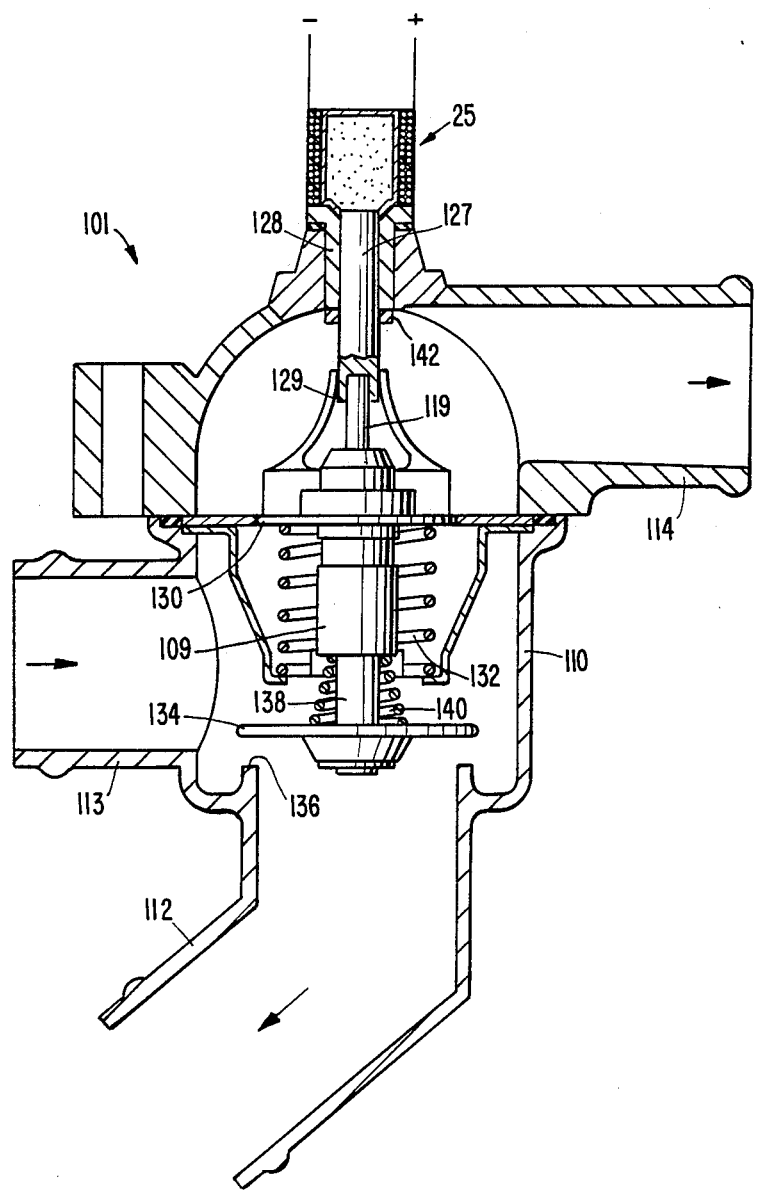
FIG. 8 is a cross-section of a double poppet valve suitable for use in the system according to the present invention for controlling the flow of cooling fluid in a cooling system for an internal combustion engine.

As can be seen from FIG. 8, a thermostatic mixing valve 101 of the double poppet type can also be employed in the engine cooling system shown in FIG. 1 and can be controlled by an of the arrangements disclosed in connection with FIGS 4–7. The valve 101 includes a body 110 having an outlet port 112, and inlet port 113 for receiving liquid directly from the engine 2, and an outlet port 114 for directing liquid to the radiator 3. A main thermostatic element 109 is mounted within the mixing valve 101, and an auxiliary thermostatic element 25 is mounted in a wall of the mixing valve 101 above the main thermostatic element 109 so that piston 119 of the main thermostatic element 109 is in alignment with a piston 127 of the auxiliary thermostatic element 25, the piston 127 having a depression at its lower end for receiving the piston 119. When the engine is cold, liquid flows through the inlet port 113 from the engine and out the outlet port 112, bypassing the radiator 3. However, as the engine warms up and the liquid entering the valve 101 through the inlet port 113 reaches the predetermined temperatures at which the wax within the main thermostatic element 109 begins to expand, the piston 119 tends to move upward, but is prevented from doing so by the presence of the piston 127. Therefore, the main body of the main thermostatic element 109 moves downward, lowering one poppet element 130, secured to the body of the main thermostatic element 109, away from its seat against the bias of a main spring 132. This movement allows flow of the incoming water from the engine 2 past the element 130, and through the outlet port 114 to the radiator 3. Thus, a portion of the water from the engine 2 passes through the radiator 3 to be cooled. As the temperature of the water entering the valve 101 increases, the valve poppet element 130 moves farther from its seat and a second poppet element 134 moves closer to its seat 136 to reduce the flow through the outlet port 112 to the line returning to the engine 2 and bypassing the radiator 3. When the temperature rises a sufficient amount, the poppet element 134 engages its seat 136 and flow through the outlet port 112 is stopped. The poppet element 134 is mounted so that it may move upwardly on a tail portion 138 of the main thermostatic element 109 and is biased to its lowermost position by an overtravel spring 140. The relationship between the operation of the main thermostatic element 109 and the auxiliary thermostatic element 25 is the same as the relationship between the thermostatic elements 9 and 25 in the embodiment of FIG. 2, and all of the applications of the valve of FIG. 2, as illustrated in FIGS. 4–7, also apply to the double poppet embodiment illustrated in FIG. 8.

In order to limit the upward travel of the piston 127 when the thermostatic element 25 is cold and, thereby, to assure a constant starting point for the operation of the piston 119 of the main thermostatic element 109, a stop member 142 is secured to the piston 127. The stop member engages the lower end of a guide 128 for the piston 127 so that excessive upward travel of the piston 127 is prevented even when the temperature of the auxiliary thermostatic element 125 is very cold and the wax within the thermostatic element has contracted more than normal. Rather than being a separate member attached to the piston 127, like the stop member 142, the stop member can comprise an enlarged portion of the piston 127, as is shown in connection with the piston 27 of FIG. 2.

Figure 9:
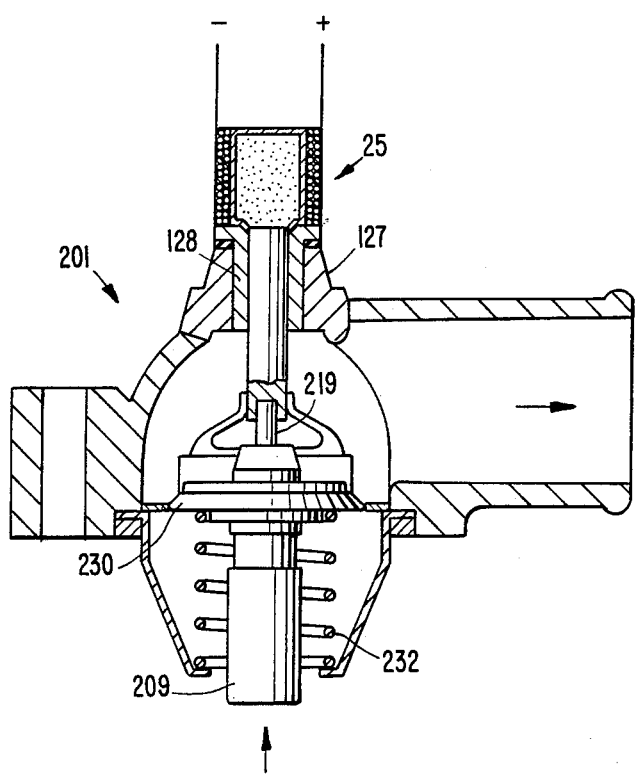
FIG. 9 is a cross-section of thermostatic nonmixing valve for use with the system for controlling the flow of cooling fluid according to the present invention.

The use of a main thermostatic element and an auxiliary thermostatic element according to the present invention can also be employed with a single poppet valve 201, as is represented in FIG. 9. The single poppet thermostatic valve 201 includes a main thermostatic element 209 having a piston 219, as well as an auxiliary thermostatic element 25 having a piston 127 and a guide 128. A poppet element 230 is held against its seat by a spring 232, and water from the engine flows against the main thermostatic element 209. When the engine is cold, the valve will be in the position shown, in which the poppet 230 engages its valve seat. When the engine warms up, the increasing temperature of the water will cause the wax within the main thermostatic element 209 to expand, tending to force the piston 219 upward, but since its movement is prevented by the piston 127, the main body of the thermostatic element 209 and the poppet valve element 230, which is attached to the main body, move downwardly, separating the poppet 230 from its seat and allowing water to flow through the valve 201. The auxiliary thermostatic element 205 can be actuated by the various parameters mentioned in connection with the other embodiments according to the present invention. Thus, the auxiliary thermostatic element 25 modulates the thermostat load, and in this way permits the adjustment of the flow through the valve 201, involving a modification of the maximum running temperature.

It is contemplated that variations and/or changes in the embodiments illustrated and described herein may be made without departing from the present invention. Accordingly, it is intended that the foregoing description is illustrative only, not limiting, and that the true spirit and scope of the present invention are determined by the appended claims.

We claim:

1. Apparatus for controlling the flow of cooling fluid in a cooling system for an internal combustion engine, wherein the cooling system includes a circulating pump, a first flow path from the engine through a heat exchanger and back to the engine and a second, bypass flow path from an outlet of the engine to an inlet of the engine, comprising:
   a thermostatic valve having a body defining a chamber;
   a first port into said chamber, said first port being in communication with the heat exchanger;
   a second port into said chamber, said second port being in communication with the engine;
   means for controlling fluid flow through said first and second ports, said fluid flow controlling means comprising at least one valve element moveable from a position closed with respect to one of said ports to control the flow through said first and second ports; and
   means for operating said fluid flow control means, said operating means comprising a first thermostatic element mounted in said chamber and connected to said valve element, said first thermostatic element being responsive to the temperature of fluid in said chamber to move said valve element relative to said ports, and a second thermostatic element connected to said first thermostatic element, said second thermostatic element operable independent of said first thermostatic element and being responsive to parameters other than and independent of the temperature of fluid in said chamber to open said valve element and, thereby, vary the operation of said fluid flow controlling means.

2. The apparatus according to claim 1, wherein said second thermostatic element is responsive to parameters other than the temperature of fluid in said chamber to move said first thermostatic element and, thereby, open the valve element.

3. A thermostatic mixing valve for a fluid cooling system of an internal combustion engine, wherein the fluid cooling system includes a circulating pump, a first flow path from the engine through a radiator and back to the engine and a second, bypass flow path from an outlet of the engine to an inlet of the engine, comprising:
   a body having a cylindrical chamber and an outlet at an axial end of the cylindrical chamber;
   at least one first inlet port into the cylindrical chamber at a level remote from said outlet of the body, said first inlet port being in communications with the radiator;
   at least one second inlet port into the cylindrical chamber at a level between the level of said first inlet port and said outlet of the body, said second inlet port being in communication with the engine;
   a first thermostatic element having a first part mounted in the cylindrical chamber and a second part moveable relative to said first part in response to the temperature of fluid in the cylindrical chamber;
   a second thermostatic element mounted on the valve body at an axial end of the cylindrical chamber opposite said outlet, said second thermostatic element having a stationary first part and a second part engaging the first part of said first thermostatic element, said second part of said second thermostatic element being moveable in response to at least one selected condition; and
   a cylindrical skirt positioned in the cylindrical chamber in sliding, sealing engagement with the valve body, said cylindrical skirt being connected to said first thermostatic element and being gradually moveable with said first thermostatic element between a position obstructing said first inlet port and permitting full flow through said second inlet port and a position obstructing said second inlet port and permitting full flow through said first inlet port.

4. The thermostatic mixing valve of claim 3, wherein said skirt has intermediate positions partially obstructing both said first inlet port and said second inlet port.

5. The thermostatic mixing valve of claim 3, wherein said first thermostatic element comprises an expansible wax element.

6. The thermostatic mixing valve of claim 3, further comprising means for biasing said second part toward an end of the cylindrical chamber remote from the outlet of the valve body.

7. The thermostatic mixing valve of claim 3, further comprising a second thermostatic element mounted on the valve body at an axial end of the cylindrical chamber opposite said outlet, said second thermostatic element having a stationary first part and a second part engaging the first part of said first thermostatic element, said second part of said second thermostatic element being moveable in response to at least one selected condition.

8. The thermostatic mixing valve of claim 7, wherein said first part of said first thermostatic element and said second part of said second thermostatic element are axially aligned.

9. The thermostatic valve of claim 3, wherein radial arms extend from said skirt to a hub, said hub being secured to said second part of the thermostatic element.

10. The thermostatic valve of claim 9, wherein said radial arms extend from an end of said skirt adjacent to said outlet of the body.

11. The thermostatic valve of claim 9, wherein said skirt, said radial arms and said hub comprise one piece.

12. Apparatus for controlling the flow of cooling fluid in a cooling system for an internal combustion engine, wherein the cooling system includes a circulating pump, a first flow path from the engine through a heat exchanger and back to the engine and a second, bypass flow path from an outlet of the engine to an inlet of the engine, comprising:
   a thermostatic mixing valve having a body defining a chamber;
   at least one first inlet port into said chamber, said first inlet port being in communication with the heat exchanger;
   at least one second inlet port into said chamber, said second inlet port being in communication with the engine;
   an outlet port into said chamber, said outlet port being in communication with the engine;
   means for controlling fluid flow from said first and second inlet ports to said outlet port; and
   means for operating said fluid flow control means, said operating means comprising a first thermostatic element mounted in said chamber and connected to said fluid flow controlling means, said first thermostatic element being responsive to the temperature of fluid in said chamber to operate said fluid flow controlling means, and a second thermostatic element connected to said first thermostatic element, said second thermostatic element being responsive to parameters other than the temperature of fluid in said chamber to move first thermostatic element and, thereby, operate said fluid flow controlling means.

13. The apparatus of claim 12, wherein the engine is mounted in a compartment, and the second thermostatic element includes an expansible wax element in heat sensing relationship with the air in the engine compartment, whereby said wax element expands and contracts in response to increases and decreases, respectively, in the temperature of the engine compartment air.

14. The apparatus of claim 12, wherein said second thermostatic element is responsive to the load on the engine.

15. The apparatus of claim 14, wherein the engine includes a throttle valve, the second thermostatic element includes an expansible wax element and an electric resistance heater in heat transfer relationship with the wax element, and the apparatus further includes a position sensor monitoring the position of the throttle, said position sensor being connected in an electric circuit with said electric resistance heater to actuate said electric resistance heater in response to the position of said throttle.

16. The apparatus of claim 14, wherein the engine is mounted in a compartment, the second thermostatic element includes an expansible wax element and an electric resistance heater in heat transfer relationship with said expansible wax element, and the apparatus further comprises a thermoswitch mounted in the engine compartment to measure the air temperature therein, said thermoswitch connected in an electric circuit with said electric resistance heater to actuate said electric resistance heater in response to the air temperature in the engine compartment.

17. The apparatus according to claim 12, wherein the engine includes a throttle and cooling fluid passages, the engine is mounted in a compartment, the second thermostatic element comprises an expansible wax element and an electric resistance heater in heat transfer relationship with said expansible wax element, and the apparatus further comprises a microprocessor having an output connected to the electric resistance heater and inputs connected to sensors monitoring a plurality of engine operation parameters.

18. The apparatus according to claim 17, wherein the inputs of the microprocessor are connected to an engine load sensor and an engine speed sensor.

19. The apparatus according to claim 18, wherein the inputs of the microprocessor are further connected to a temperature sensor monitoring the temperature of the cooling fluid in the cooling fluid passages and an engine speed sensor.

20. The apparatus according to claim 17, wherein the engine has adjustable fuel injectors and an auxiliary air valve, and said microprocessor has outputs connected to the fuel injectors and the auxiliary air valve.

21. The apparatus according to claim 20, wherein the inputs of the microprocessor are connected to a temperature sensor monitoring the temperature of the cooling fluid in the cooling fluid passages and to an engine speed sensor.

22. The apparatus according to claim 21, wherein the inputs of the microprocessor are further connected to a thermoswitch exposed to the air in the engine compartment.

23. The apparatus according to claim 21, wherein the inputs of the microprocessor are further connected to an engine load sensor.

24. A thermostatic mixing valve for a fluid cooling system of an internal combustion engine, wherein the fluid cooling system includes a circulating pump, a first flow path from the engine through a radiator and back to the engine and a second, bypass flow path from an outlet of the engine to an inlet of the engine, comprising:
   a body having a cylindrical chamber and an outlet at an axial end of the cylindrical chamber;
   at least one first inlet port into the cylindrical chamber at a level remote from said outlet of the body, said first inlet port being in communication with the radiator;

at least one second inlet port into the cylindrical chamber at a level between the level of said first inlet port and said outlet of the body, said second inlet port being in communication with the engine;

a first thermostatic element having a first part mounted in the cylindrical chamber and a second part moveable relative to said first part in response to the temperature of fluid in the cylindrical chamber; and a cylindrical skirt positioned in the cylindrical chamber in sliding, sealing engagement with the valve body, said cylindrical skirt being connected to said first thermostatic element and being gradually moveable with said first thermostatic element between a position obstructing said first inlet port and permitting full flow through said second inlet port and a position obstructing said second inlet port and permitting full flow through said first inlet port, said skirt having intermediate positions partially obstructing both said first inlet port and said second inlet port, wherein said first and second inlet ports each have a dimension parallel to the axis of the cylindrical chamber, each said dimension having an end remote from the outlet of said body, and said skirt has an axial length approximately equal to the axial distance between said remote end of the axial dimension of the first inlet port and said remote end of the axial dimension of the second inlet port.

* * * * *